March 13, 1973 SHIZUO NAKAGAMI 3,720,523

DRESSING CONTAINER ASSEMBLY

Filed Oct. 16, 1970

INVENTOR
Shizuo Nakagami
BY Wenderoth, Lind & Ponack
ATTORNEY

United States Patent Office 3,720,523
Patented Mar. 13, 1973

3,720,523
DRESSING CONTAINER ASSEMBLY
Shizuo Nakagami, 7-26, 1-chome Shimomae,
Toda, Japan
Filed Oct. 16, 1970, Ser. No. 81,292
Int. Cl. B65b 29/10
U.S. Cl. 99—171 CP                    6 Claims

ABSTRACT OF THE DISCLOSURE

The present disclosure relates to a container assembly designed to allow instant preparation of fresh dressing and immediate serving thereof on the table. According to the invention, a lower container containing salad oil and an upper container containing a spice-vinegar mixture are integrally joined. A cutter assembly is fixedly provided at the opening portion or mouth of the oil container and has a piston erected at the center of the base of said assembly. A seal is tightly secured at the end of the opening portion or mouth of the vinegar container and a cylinder is provided at the center of said seal. The mouth of the upper container is not fixed to the inner face of the cutter assembly but is arranged to be freely rotatable. The wall portion of the base of the seal that surrounds the cylinder is made very thin so that when the upper container is pressed into the lower container, said thinned portion is broken to remove the partition between said containers, thus allowing the intermixture of their contents. The mixed contents are then shaken for better mixing thereof, whereby salad dressing for one meal is readily prepared.

BRIEF DESCRIPTION OF THE INVENTION

This invention relates to the construction of a capsule type dressing container assembly comprising an integral combination of a container which contains salad oil and a container which contains a mixture of spice and vinegar. When it is desired to serve dressing, a partition wall between said containers is broken away with a single finger movement to mix the contents in both containers, and the mixed contents are then shaken for good and sufficient mixing thereof, thereby to instantly prepare the desired salad dressing.

OBJECTS OF THE INVENTION

Beside dressing, various other substances such as mayonnaise, table salt, vinegar and so forth are used as seasonings for salads. Among these substances, dressing is most inconvenient to use. It is troublesome to blend salad oil, vinegar spice, etc., at correct proportions. Further, such dressing, once prepared, is usually subject to change in taste in half a day and cannot keep long.

The object of the present invention is to provide a container assembly which eliminates such inconvenience and which enables one to easily and instantly prepare fresh dressing whenever so desired.

DETAILED DESCRIPTION OF THE INVENTION

The above-said object and advantages of the present invention will become more apparent from the following detailed description and the drawings embodying the present invention.

Figure 1:
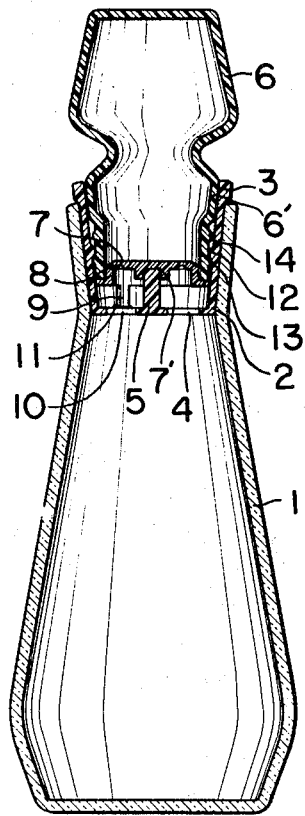
FIG. 1 is a front sectional view of the present container assembly before use.
Figure 2:
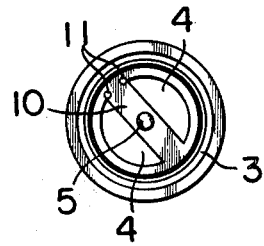
FIG. 2 is a plane view of the cutter assembly.
Figure 5:
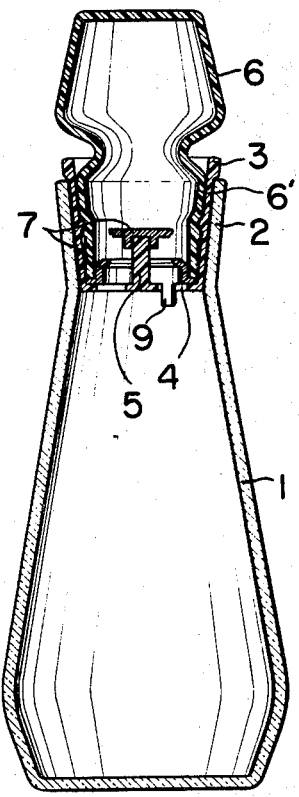
FIG. 5 is a front sectional view of the container assembly in use.

A cup-shaped cutter assembly 3 is secured at the opening portion or mouth 2 of the salad oil container 1. At the base of the cup, as best shown in FIGS. 1 and 2, are formed more than one through holes 4, and a cylindrical piston 5 is erected at the center of said base. The salad oil container 1 may be formed by a hollow molding process with glass, porcelain or oil-proof plastic such as hard vinyl chloride. The cutter assembly 3 is preferably made from the injection molding of plastic material which has oil resistance and suitable rigidity, such as for example medium or low pressure process polyethylene or polypropylene. The container 6 filled with a spice-vinegar mixture is covered with a cup-shaped seal 7. Said container 6 is made of hard vinyl chloride, medium or low pressure process polyethylene or the like, while the seal 7 is composed of soft high pressure process polyethylene or the like. It is to be noted that the mouth 6' of the container 6 is of a size sufficient to snugly fit into the inside of the cutter assembly 3 as shown. Container 6 is not fixed to the inner face of the cutter assembly 3 but is arranged to be freely rotatable therewith.

Figures 3, 4:
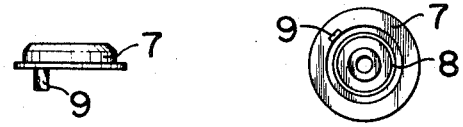
FIG. 3 is a front view of the seal element.
FIG. 4 is a bottom view of said seal element.

At the center of said seal 7 is provided a cylinder 7' adapted to receive the head portion of the piston 5, and the outer wall of said seal 7 is tightly secured to the inner wall of the mouth 6'. The seal 7 is mounted and secured in the mouth 6' after filling the container 6 with the spice-vinegar mixture. As will be understood from FIG. 1, as the mouth 6' is inserted into the inside of the cutter assembly 3, the piston 5 is fitted into the cylinder 7' until the former reaches the base of the seal 7, whereby the container 6 is held back from further entering into the container 1. It should be also noted that a thinned portion is formed in the base of the seal 7 concentrically with the cylinder 7', and a projection 9 is formed at a corner of the underside of the seal 7 as shown in FIGS. 1, 3 and 4. Said projection 9 is so arranged that when the mouth 6' is initially inserted into the mouth 2 of the container 1, said projection will stay on the base 10 of the cutter assembly 3 (see FIG. 2). Beside the presence of the piston 5, abutment of the projection 9 against the base 10 also helps to define the ingress of the container 6 into the container 1. On the base 10 are also provided smaller projections 11 on both sides of a position where the projection 9 abuts. These smaller projections 11 are adapted to play the role of detents for checking accidental rotation of the container 6. Namely, in case the container 6 should be accidentally or inadvertently given an external force acting to rotate it, the projection 9 hits and is held back by the small projections 11 from moving in either direction to thereby inhibit rotation of the container 6. However, if the container 6 is forcibly rotated on purpose, the projection 9 will get over the small projection 11 to reach a hole 4. It will also be seen that a circumferential projection or ridge 12 is provided on the inner face of the cutter assembly 3, and similar circumferential projections or ridges 13 and 14 are provided on the outer surface of the mouth portion 6' of the container 6. When the mouth portion 6' is inserted into the cutter assembly 3, first the projection 13 hits the projection 12 and is checked thereby, but if said portion is further pushed in with application of a little stronger force, said projection 13 gets over the projection 12 and stays at a position such as shown in FIG. 1. That is, the projection 12 is positioned between the projections 13 and 14, whereby both containers 1 and 6 are securely joined together to give greater carrying convenience.

In using the container assembly according to the present invention, the user buys a container 6 which contains a predetermined amount of spice-vinegar mixture (that may contain other materials if desired) and which is sealed with a seal 7, and then inserts said container 6 into another container 1 filled with a predetermined amount of salad oil, in the manner as shown in FIG. 1. In this case, said containers 1 and 6 are preferably so positioned relative to each other that the projection 9 will stay on the base 10 of the cutter assembly 3. When it is desired to serve salad dressing, the user turns the container 6 such that the projection comes over one of the holes 4 and then strongly pushes the container 6 into the container 1. Since the seal 7 is integral with the container 6, it is pulled downwardly while being resisted by the piston 5 until finally the thinned portion of the base 10 is broken, allowing additional descent of the container 6 such that the projection 9 comes over one of attachment with the mouth 2 of the container 1. In this manner, the partition between the spice-vinegar mixture and the salad oil is removed to allow inter-mixture of both materials. The joined assembly of both containers 1 and 6 is then shaken to sufficiently mix up the materials to thereby instantly prepare the desired salad dressing for one meal, and this container assembly is placed on the table for serving as desired. In addition, the container 6 can serve as a cap for the container 1.

Thus, according to the present invention, since salad oil and the spice-vinegar mixture are separately contained in the respective containers normally separated by a partition, there is no fear of causing any change in taste or quality, and the desired salad dressing can be prepared instantly whenever so desired. Further, if the user buys and keeps on hand a salad oil container 1 for the exclusive use as shaker, it may be repeatedly used for each preparation of salad dressing by buying capsules of the spice-vinegar mixture, and thus the expense for packaging required will be only for the dressing capsules. In this way it is possible to enjoy the taste of fresh salad dressing at a low expense whenever one wants it.

What I claim is:
1. A dressing container assembly comprising:
   (a) a first container (1) adapted to contain a first fluid material and having a mouth opening (2) at one end thereof;
   a cutter means (3) attached to said mouth, said cutter means (3) being cup-shaped and having a base portion (10) and a piston (5) projecting upwardly from said base (10) towards the interior of said cup, said base (10) further having at least one hole passing therethrough into the interior of said first container (1);
   a second container (6) adapted to be inserted into the mouth (2) of said first container (1) such that said cutter means separates said first and second containers, said second container (6) further being adapted to contain a second fluid material and having a mouth at one end thereof;
   a sealing element (7) fixedly secured to and closing the mouth of said second container (6), said sealing element (7) having a thicker portion and a thinner portion surrounding said thicker portion, said thicker portion being engageable with said piston (5) when said second container (6) is partially inserted into the mouth (2) of said first container (1);
   whereby when said second container (6) is forcibly further inserted into said first container (1) the piston (5) of said cutter (3) pushes the thicker portion of said sealing element (7) upward to break said thinner portion thereof permitting the contents of said second container (6) to flow into said first container (1) through said holes (4) in said base (10).

2. A dressing container assembly as claimed in claim 1 wherein said sealing element (7) further includes a projection (9) formed on said element and extending outwardly of said second container (6), said projection (9) being engageable with said base (10) when said first and second containers are in a first relative position and said projection (9) being aligned with one of said holes (4) when said first and second containers are in a second relative position, whereby said projection (9) prevents said second container (6) from being forcibly inserted into said first container (1) when said first and second containers are in said first relative position.

3. A dressing container assembly as claimed in claim 1 wherein said cutter means (3) is removably attached to said mouth (2).

4. A dressing container assembly as claimed in claim 1 wherein said first container (1) contains salad oil and said second container (6) contains a spice-vinegar mixture.

5. A dressing container assembly as claimed in claim 1 wherein said cutter means (3) is fixedly attached to said mouth (2).

6. A dressing container assembly as claimed in claim 5 wherein said first container (1) contains salad oil and said second container (6) contains a spice-vinegar mixture.

References Cited
UNITED STATES PATENTS

| | | | |
|---|---|---|---|
| 3,347,410 | 10/1967 | Schwartzman | 206—47 A X |
| 2,653,610 | 9/1953 | Smith | 215—6 X |
| 3,415,360 | 12/1968 | Baumann et al. | 206—47 A |
| 2,232,978 | 2/1941 | Smith | 206—47 A X |
| 2,835,246 | 5/1958 | Boettger | 215—6 X |

FOREIGN PATENTS

| | | |
|---|---|---|
| 1,932,783 | 2/1970 | Germany. |
| 638,326 | 4/1962 | Italy. |

TIM R. MILES, Primary Examiner

S. L. WEINSTEIN, Assistant Examiner

U.S. Cl. X.R.

99—171 C; 206—47 A; 215—6